(12) United States Patent
Kamal et al.

(10) Patent No.: US 7,291,009 B2
(45) Date of Patent: Nov. 6, 2007

(54) DUAL STACKED GAS BURNER AND A VENTURI FOR IMPROVING BURNER OPERATION

(75) Inventors: Azfar Kamal, Louisville, KY (US); Paul Bryan Cadima, Prospect, KY (US); Shree Kumar, Bangalore (IN); Sudeep Pradhan Sadananda Rao, Karnataka (IN)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 10/935,848

(22) Filed: Sep. 8, 2004

(65) Prior Publication Data

US 2006/0051718 A1    Mar. 9, 2006

(51) Int. Cl.
*F23D 14/06* (2006.01)
*F23D 14/02* (2006.01)

(52) U.S. Cl. .............. 431/284; 431/354; 431/278; 431/349; 126/39 R; 126/39 E; 239/549; 239/553.5; 239/558

(58) Field of Classification Search ............. 431/286, 431/278, 283, 284, 285, 354; 239/548, 549, 239/552, 554, 555, 558, 560, 561, 567, 568; 126/39 R, 39 E, 39 N, 39 K
See application file for complete search history.

(56) References Cited

U.S. PATENT DOCUMENTS

| 1,923,393 | A | * | 8/1933 | Pickup ..................... 239/543 |
| 3,627,462 | A | * | 12/1971 | Lotter ..................... 431/284 |
| 4,891,006 | A | * | 1/1990 | Le Monnier de Gouville et al. ................................................ 431/349 |
| 5,000,162 | A | | 3/1991 | Shimek et al. |
| 5,104,311 | A | | 4/1992 | Maughan et al. |
| 5,277,576 | A | | 1/1994 | Hartung et al. |
| 5,401,164 | A | | 3/1995 | Yen |
| 5,408,984 | A | | 4/1995 | Maughan |
| 5,464,004 | A | | 11/1995 | Maughan |
| 5,488,942 | A | | 2/1996 | Maughan |
| 5,494,027 | A | | 2/1996 | Maughan |
| 5,791,890 | A | | 8/1998 | Maughan |
| 5,800,159 | A | | 9/1998 | Maughan et al. |
| 5,842,849 | A | * | 12/1998 | Huang ..................... 431/284 |
| 5,899,681 | A | | 5/1999 | Maughan |
| 5,915,956 | A | * | 6/1999 | Kwiatek et al. ............ 431/349 |
| 6,082,994 | A | * | 7/2000 | Grandveau et al. ......... 431/349 |

(Continued)

FOREIGN PATENT DOCUMENTS

DE          4434742      *    4/1996

(Continued)

*Primary Examiner*—Carl D. Price
(74) *Attorney, Agent, or Firm*—George L. Rideout, Esq.; Armstrong Teasdale LLP

(57) ABSTRACT

A cooktop burner assembly is described. The cooktop burner assembly includes a main burner, and a simmer burner located below the main burner, where a diameter of the simmer burner is greater than a diameter of the main burner. The closer placement of the main burner to a cooking vessel placed on top of the cooktop burner assembly as compared to the placement of the simmer burner from the cooking vessel increases thermal efficiency. Moreover, the farther placement of the simmer burner from the cooking vessel facilitates simmering of items in the cooking vessel and the larger diameter of the simmer burner reduces a possibility of overheating the main burner and the cooking vessel.

19 Claims, 14 Drawing Sheets

U.S. PATENT DOCUMENTS

| | | | | |
|---|---|---|---|---|
| 6,095,802 A | * | 8/2000 | Kwiatek | 431/349 |
| 6,263,868 B1 | | 7/2001 | Koch et al. | |
| 6,322,354 B1 | * | 11/2001 | Carbone et al. | 431/284 |
| 6,322,654 B1 | | 11/2001 | Walter et al. | |
| 6,325,619 B2 | * | 12/2001 | Dane | 431/284 |
| 6,332,460 B1 | * | 12/2001 | Paesani | 126/39 R |
| 6,371,754 B1 | | 4/2002 | Haynes | |
| 6,780,008 B2 | * | 8/2004 | Koch et al. | 431/354 |
| 2001/0041316 A1 | | 11/2001 | Haynes et al. | |

FOREIGN PATENT DOCUMENTS

| | | | |
|---|---|---|---|
| EP | 1028286 | * | 8/2000 |
| EP | 1180642 | * | 2/2002 |
| FR | 2650369 | * | 7/1990 |
| JP | 60 149818 | * | 8/1985 |
| JP | 11-223310 | * | 8/1999 |
| JP | 2000-88214 | * | 3/2000 |
| JP | 2001-56108 | * | 2/2001 |
| JP | 2002-228118 | * | 2/2002 |
| JP | 2003-83516 | * | 3/2003 |
| WO | WO99/08046 | * | 2/1999 |
| WO | WO 2004/044490 | * | 5/2004 |

* cited by examiner

FIG. 11 (shown from 0 to 20)

DUAL STACKED GAS BURNER AND A VENTURI FOR IMPROVING BURNER OPERATION

BACKGROUND OF THE INVENTION

This invention relates generally to gas burners and more particularly to gas burners used as surface heating units in cooking appliances and apparatus and methods for improving operation of such burners.

For gas burners used as surface heating units in cooking appliances such as ranges and cooktops, a high turndown ratio, which is a ratio of maximum output to minimum output, is often desirable. For a given burner, the maximum output typically signifies the "power" or "speed" of the burner and the minimum output is related to the simmer capability of a burner. The maximum output is limited by system gas flow handling capabilities and safety considerations. The minimum output is limited by the ability of the burner to maintain a stable flame under transient pressure fluctuation conditions such as may be caused by air currents in the room, or sudden opening or closing of under the cooktop's cabinet doors or oven door.

Either horizontal or vertical staging of cooktop burners is used for improving cooking performances. A horizontally staged burner uses two or more rings of gas outlets or ports that are staged radially in a somewhat horizontal plane. The inner most stage is often used for simmer while all the combined stages are used for power cooking. In a vertically staged burner, either of two stages can be used for simmer while the combination of both stages is utilized for power cooking. In a vertically staged burner, if the simmer stage is the lower of two stages then this configuration has the added advantage of distance between the flame and a pot placed on top of the cooktop burner. Nevertheless, the above limitations on performance also apply to the horizontally and vertically staged burners.

A vast majority of gas burners used in cooking applications are partially pre-mixed burners using both primary-air and secondary-air. Based on whether the primary-air is drawn from above the cooktop or below the cooktop, these burners are either top-breathers or down-breathers respectively. Top-breather burners sometimes referred to as open or non-sealed burners, are insensitive to pressure fluctuations due to oven or cabinet doors but are sensitive to room air currents. The turndown of these burners is also limited due to lower port loading design constraints. In down-breather burners, also referred to as sealed burners, there is no gap around the burner to allow spills or air to get inside the cooktop. The sealed burners are sensitive to pressure fluctuations under the cooktop.

The partially-premixed burners generally use a venturi to induce primary-air into the burner and mix it with the fuel gas ejecting from the gas orifices. Venturi design has been traditionally mostly empirical or experimental. A burner designer looks at the physical geometrical constraints and then uses scaling factors or past experience to design the venturi. Optimization is also by trial-and-error. This does not fully exploit the potential of the venturi and slows down the design process and compromises performance of the partially-premixed burners.

BRIEF DESCRIPTION OF THE INVENTION

In one aspect, a cooktop burner assembly is provided. The cooktop burner assembly includes a main burner, and a simmer burner located below the main burner, where a diameter of the simmer burner is greater than a diameter of the main burner. The closer placement of the main burner to a cooking vessel placed on top of the cooktop burner assembly than that of the simmer burner decreases an amount of time taken to heat the cooking vessel. Moreover, the farther placement of the simmer burner facilitates simmering of items placed within the cooking vessel. Furthermore, the larger diameter of the simmer burner reduces chances of overheating of the cooking vessel because heat spreads more evenly over the cooking vessel.

In another aspect, the cooktop burner assembly is a gas burner assembly that includes a first burner, a second burner located below the first burner, and a chamber located below the second burner, where the chamber is configured as a primary air reservoir for one of the first and second burners. At least a portion of the chamber is to be located above the cooktop surface. The portion to be located above the cooktop is configured to draw air from above the cooktop surface rather than from below the cooktop surface in order to isolate the burner which receives air from the chamber from air pressure changes occurring below the cooktop surface.

In yet another aspect, a gas burner assembly includes a venturi configured to supply a gas-air mixture to the burner, where dimensions of the venturi conform to a shape of a flow of the gas-air mixture within the venturi.

DETAILED DESCRIPTION OF THE INVENTION

While the apparatus and methods for improving operation of a gas burner are herein described in the context of a gas-fired cooktop, as set forth more fully below, it is contemplated that the methods and apparatus may find utility in other applications, including, but not limited to, gas heater devices, gas ovens, gas kilns, gas-fired meat smoker devices, gas barbecues, and any other applications in which a venturi is used in conjunction with a gas burner. In addition, the principles and teachings set forth herein may find equal applicability to combustion burners for a variety of combustible fuels. The description below is therefore set forth only by way of illustration rather than limitation, and any intention to limit practice of the described apparatus and methods to any particular application is expressly disavowed.

Figure 1:
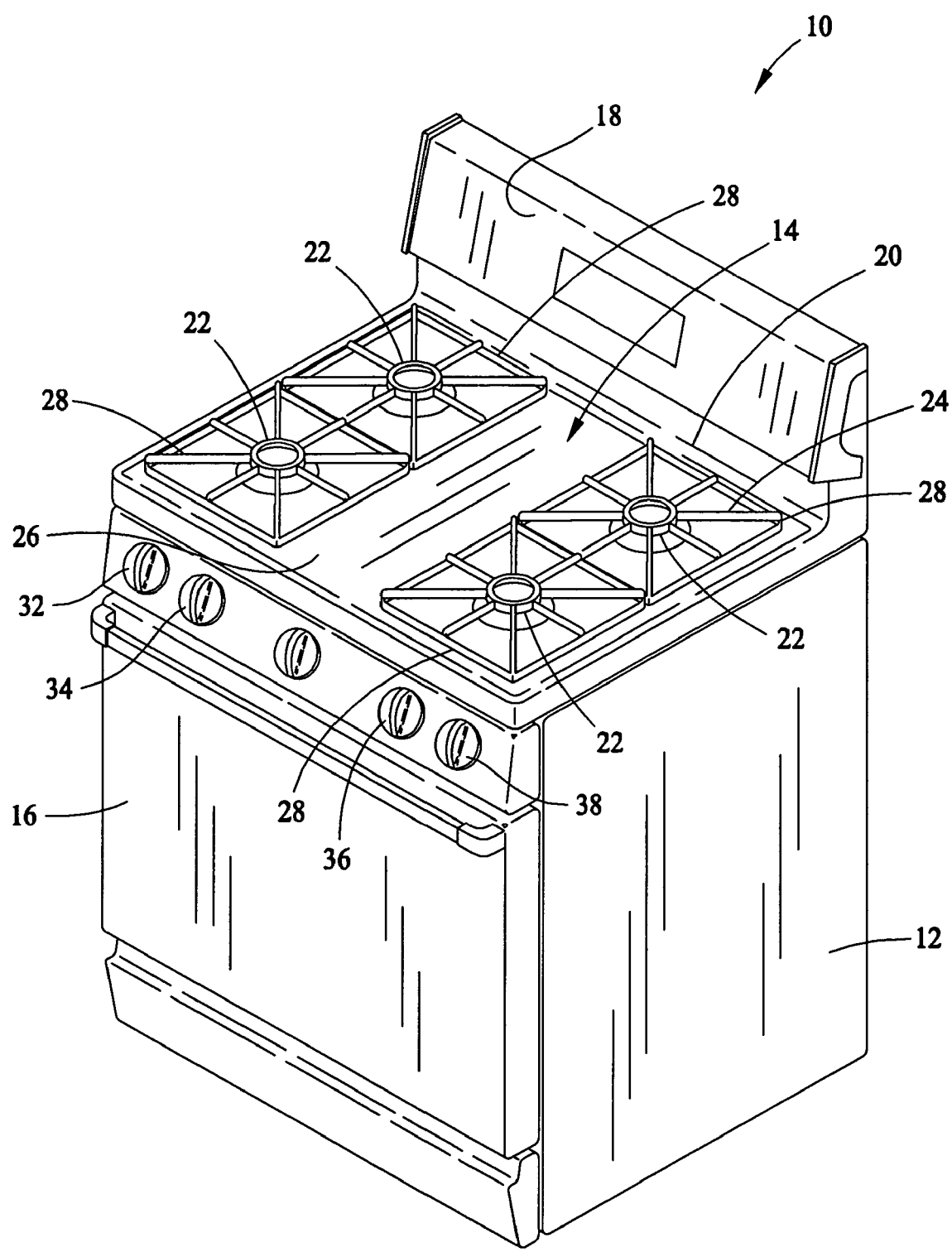
FIG. 1 illustrates an embodiment of a free-standing gas range in which the herein described apparatus and methods for improving operation of a gas burner may be practiced.

FIG. 1 illustrates an exemplary free-standing gas range 10 in which the herein described apparatus and methods may be practiced. Range 10 includes an outer body or cabinet 12 that incorporates a generally rectangular cooktop 14. An oven, not shown, is positioned below cooktop 14 and has a front-opening access door 16. A range backsplash 18 extends upward from a rear edge 20 of cooktop 14 and contains various control selectors (not shown) for selecting operative features of heating elements for cooktop 14 and the oven.

Cooktop 14 includes four gas fueled burner assemblies 22 which are positioned in spaced apart pairs positioned adjacent each side of cooktop 14. Each burner assembly 22 extends upwardly through an opening in cooktop 14, and a grate 28 is positioned over each burner 22. Each grate 28 includes a horizontally extending support structure thereon for supporting cooking vessels and cooking vessels over burner assemblies 22 for cooking of meal preparations placed therein.

Cooktop 14 also includes control devices, such as, knobs 32, 34, 36, and 38 that are manipulated by a user to adjust the setting of a corresponding gas valve (not shown) to control the amount of heat output from the corresponding one of burners 22. For example, rotating knob 32 in one direction switches the valve from off to the full on position. Continued rotation gradually moves the valve from the full open position to the minimum setting position. In this fashion the user may adjust the heat output of the corresponding burner to the desired level.

It is contemplated that the herein described apparatus and methods are applicable, not only to cooktops which form the upper portion of a range, such as range 10, but to other forms of cooktops as well, such as, but not limited to, cooktops that are mounted to a kitchen counter. Therefore, range 10 is provided by way of illustration rather than limitation, and accordingly there is no intention to limit application of the herein described apparatus and methods to any particular appliance or cooktop, such as range 10 or cooktop 14. It is also understood that there can be any other number of burner assemblies or any combination of burner assemblies and other type of cooking surfaces, such as, grills and hot plates, included in cooktop 14.

Figure 2:
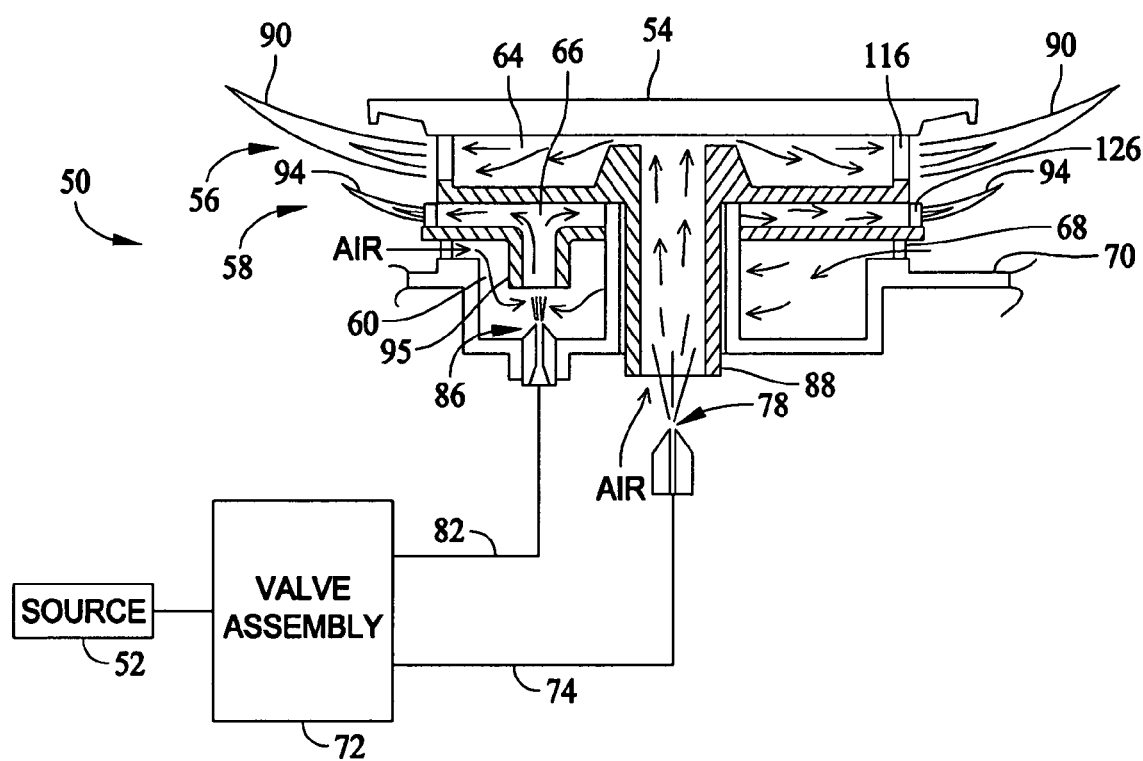
FIG. 2 shows in schematic form an embodiment of a burner assembly that can be incorporated within the range of FIG. 1.

FIG. 2 shows an embodiment of a burner assembly 50 coupled to a source 52 of gas. Burner assembly 50 includes a cap 54, a main burner 56, a simmer burner 58, and a primary-air chamber 60. Main burner 56 includes a main burner chamber 64 and ports 116, and simmer burner 58 includes a simmer burner chamber 66 and ports 126. Main burner chamber 64 is isolated from simmer burner chamber 66 to prevent the air-gas mixture within main burner chamber 64 from flowing to simmer burner chamber 66 and similarly, to prevent the air-gas mixture within simmer burner chamber 66 from flowing to main burner chamber 64. Primary-air chamber 60 includes ports 68 that enable the flow of primary-air to primary-air chamber 60. Ports 68 are shown in the form of slots, but could be other forms of apertures as well. Each of the ports 68 of primary-air chamber 60 is located along a circumference of the primary-air chamber 60. Primary-air chamber 60 is supported by a cooktop surface 70. Alternatively, the cooktop surface 70 could be supported by the primary air chamber 60, which in such an arrangement would be supported from other structure, such as, for example, side or bottom walls of a burner box (not shown) underlying cooktop 14.

In the burner assembly of FIG. 2, main burner 56 and simmer burner 58 are concentric with respect to each other. The simmer burner 58 is located below main burner 56. The diameter of a circumference along which the ports 126 of simmer burner 58 are situated is greater than the diameter a circumference along which the ports 116 of main burner 56 lie. The smaller diameter of main burner 56 with respect to simmer burner 58 and its closeness to a cooking pot placed on top of main burner 56, facilitates focusing the main burner flame with a high output on the cooking pot to increase thermal efficiency. Moreover, simmer burner 58 with a larger diameter than main burner 56 facilitates the spreading of the smaller output simmer flame over a larger diameter to diffuse the heat. The increased distance between the simmer burner 58 and the cooking pot, resulting from placement of the simmer burner 58 under the main burner 56, facilitates a low temperature slow cooking of items placed within the cooking pot. The larger diameter of simmer burner 58 by moving flames produced by the simmer burner outward also has the advantage of lower temperatures for the walls of main burner 56

Source 52 of gas supplies gas via a valve assembly 72, a gas conduit 74, and an orifice 78 to main burner chamber 64. Source 52 of gas also supplies gas via valve assembly 72, a gas conduit 82, and an orifice 86 to simmer burner chamber 66. The main burner chamber 64 receives primary-air from under cooktop surface 70. This primary-air mixes with the gas supplied via orifice 78 to form a partially air-gas mixture. The air-gas mixture flows through a venturi 88 to main burner chamber 64 and the air-gas mixture is ignited by an ignition source (not shown), such as a spark ignition electrode or a hot surface igniter, to generate flames 90. The flames 90 use secondary air from above the cooktop 14 to complete combustion.

Simmer burner chamber 66 receives primary-air from primary-air chamber 60 located below simmer burner 58 which serves as a primary air reservoir for simmer burner 58. A portion of primary-air chamber 60 extends above cooktop surface 70. The sidewall of the portion extending above cooktop surface 70 has formed therein ports 68. Primary-air from above cooktop surface 70 is drawn into the reservoir formed by primary air chamber 60 through ports 68, thereby isolating simmer burner 58 from dynamic air pressure changes beneath cooktop surface 70 and generating stable flames 94. Simmer burner 58 is isolated from the dynamic air pressure changes beneath cooktop surface 70 because air inlet openings (not shown) that provide air to primary air chamber 60 are not located beneath the cooktop surface 70. The dynamic pressure changes are caused by a variety of factors, such as, ambient conditions, and opening or closing of front-opening access door 16. The air within primary-air chamber 60 mixes with the gas supplied via orifice 86 to form an air-gas mixture. The air-gas mixture flows through an offset venturi 95 to simmer burner chamber 66, where the air-gas mixture is ignited by an ignition source (not shown) to produce flames 94.

In the illustrative embodiments described herein, main burner 56 has a larger energy output, measured in BTU/hour (BTU/hr), than that of simmer burner 58. In one such embodiment, energy output from both the simmer burner 58 and the main burner 56 may be varied by the user. The energy output from main burner 58 ranges between 2,000 and 17,000 BTU/hr and energy output from simmer burner 58 ranges between 1,000 and 2,000 BTU/hr, with a total maximum energy output from both main burner 56 and simmer burner 58 equal to 19,000 BTU/hr.

When knob 32 is at the maximum setting, a maximum value, e.g., 2000 BTU/hr, is output from simmer burner 58, and a maximum value, for example, 17,000 BTU/hr, is output from main burner 56. As knob 32 is turned in the direction of lower settings, energy output from main burner 56 decreases accordingly. If knob 32 is turned further to a simmer range, main burner 56 is deenergized and simmer burner 58 stays energized. With the knob 32 in the simmer range, energy output from simmer burner 58 can be controlled, such as, for example, increased or decreased.

In the foregoing description, both main and simmer burners 56 and 58 are operable simultaneously when the main burner 56 is operated at levels above the simmer range. Alternatively, the valve assembly 72 includes a dual valve that allows only one burner to operate at a time. For example, the main burner 56 becomes a dedicated power burner to fast boil and cook foods and the bottom simmer burner 58 is dedicated for slow cooking and simmering foods. In this embodiment, the simmer burner output range could be 1000-2000 Btu/hr and the output range for the main burner could be 4,000-18,000 Btu/hr.

In another alternative embodiment, the energy output from simmer burner 58 is fixed at some predetermined desired low setting, for example, 1200 Btu/hr and the energy output from main burner 56 is variable to be between 1500 BTU/hr and a high value 16,800 Btu/hr. The total of outputs of main burner 56 and simmer burner 58 is 18000 Btu/hr. In this case, the simmer burner output and the minimum main burner output are kept close enough to minimize energy output jump during transition from one burner to the other. If knob 32 is turned to vary the output of the main burner 56, energy output from simmer burner 58 is not affected. If knob 32 is turned to a simmer position, main burner 56 is deenergized and energy output from simmer burner 58 stays fixed. When knob 32 is turned to an "off" position, both main 58 and simmer burners 56 are deenergized. Valve assembly 72 that is operable to provide a fixed energy output from simmer burner 58 is less complex than one that is operable to provide a variable energy output from simmer burner 58. Moreover, when operated with simmer burner 58 having a fixed energy output, main burner 56 has a higher turn down ratio compared to when main burner 56 is operated with simmer burner 58 having a variable energy output.

Although one orifice 78 is shown, it will be appreciated that the gas could be fed to main burner chamber 64 via multiple orifices, where each orifice is coupled to gas conduit 74. Similarly, although one orifice 86 is shown, gas could also be fed to simmer burner chamber 66 via multiple orifices, where each orifice is coupled to gas conduit 82. Moreover, instead of two physically detached gas conduits 74 and 82, gas conduits 74 and 82 could be located within one physical body.

In the embodiment hereinbefore described, primary-air chamber 60 draws air from above the cooktop surface 70. In an alternative embodiment, primary-air chamber 60 is altered to draw air from under cooktop surface 70 but provides sufficient resistance in the air flow path to act as a buffer against the dynamic pressure changes. In this embodiment, the primary-air chamber 60 has a small hole or a series of perforations at the bottom of the chamber to provide the desired resistance. The individual hole sizes of the perforation is small enough to avoid large eddies moving in and out of the primary-air chamber 60 freely. At the same time, the collective size of perforations is enough to maintain the desired stoichiometry in the simmer burner 58. Preferably, the simmer burner 58 will have a fuel-rich mixture with stoichiometric ratio ( )>1. Additionally, a baffle can be placed between these perforations and the orifice 86.

Figure 3A:
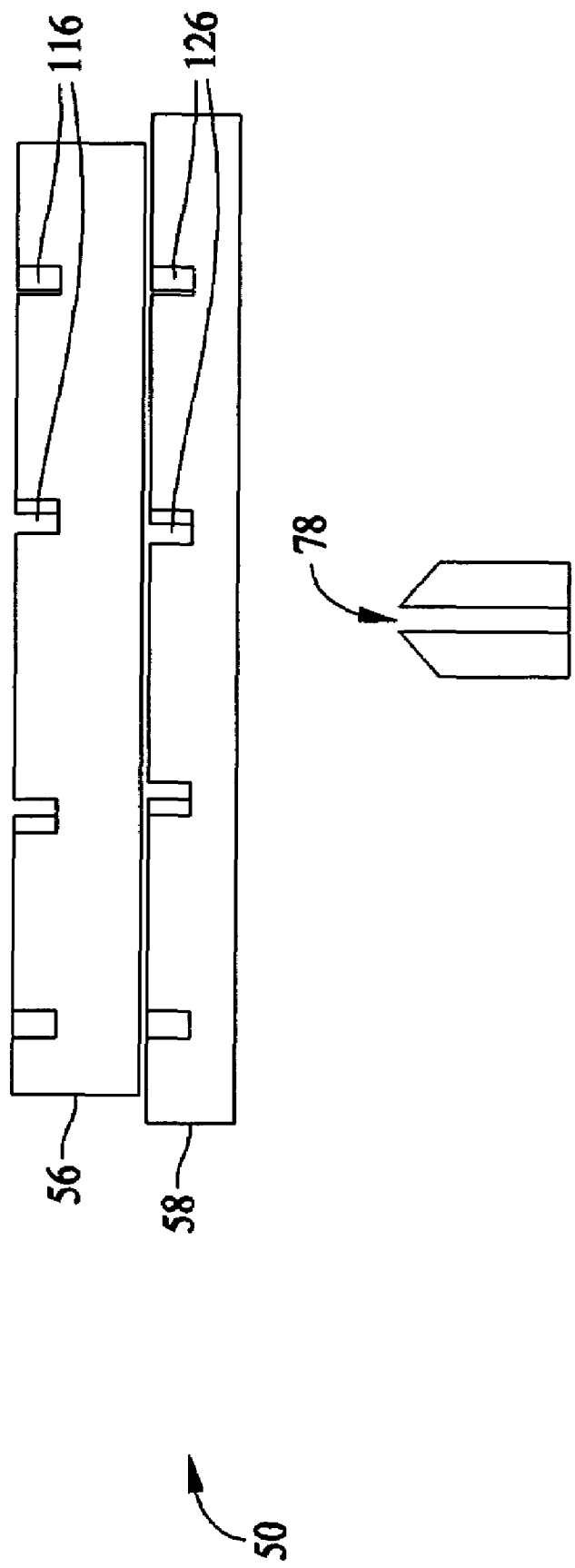
FIG. 3A is a block diagram of an embodiment of burner of FIG. 1.

FIG. 3A shows a block diagram of an embodiment of burner assembly 50. Burner assembly 50 includes main burner 56 having ports 116 and simmer burner 58 having ports 126. A number of ports 126 located along a circumference of simmer burner 58, is equal to a number of ports 116 located at a circumference of main burner 56. The flow exit dimensions of the ports 126 are smaller than those of ports 116.

Figure 3B:
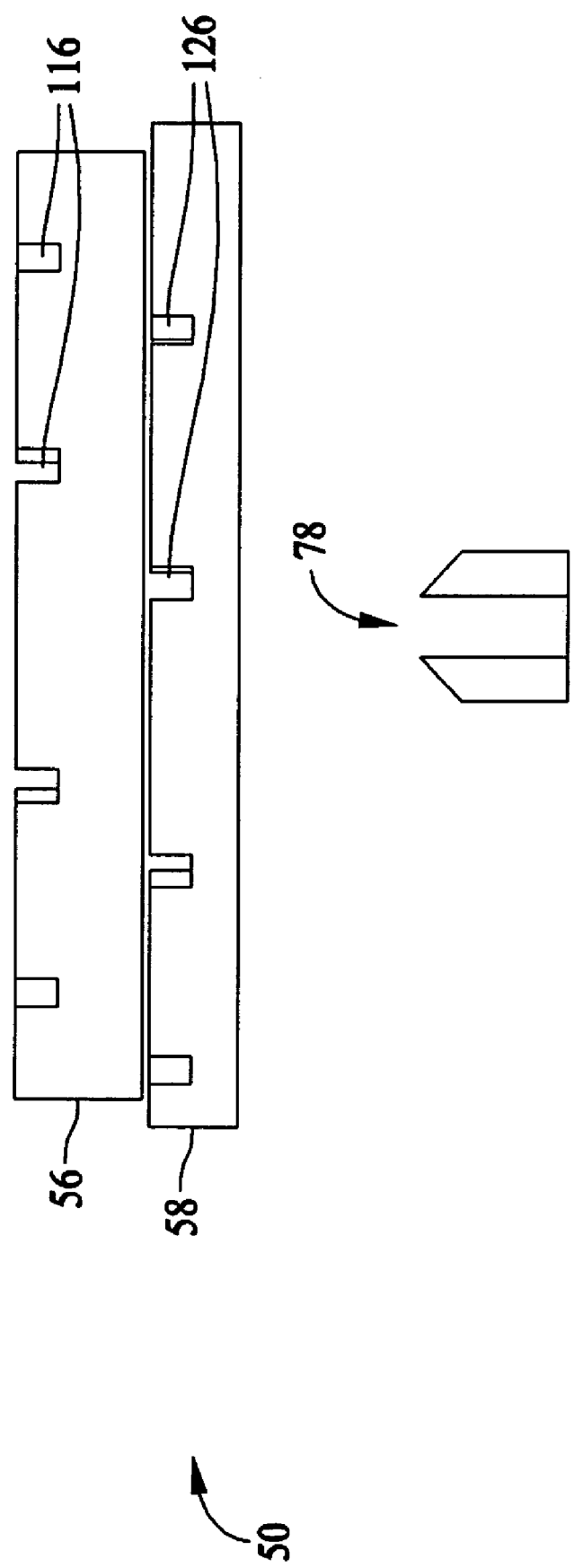
FIG. 3B is a block diagram of an alternative embodiment of a burner assembly.

FIG. 3B shows a block diagram of an alternative embodiment of burner assembly 50, in which ports 116 and 126 are not aligned. For example, port 116 is located within main burner 56 but between two ports 126 of simmer burner 58. While in the embodiments of FIGS. 3A and 3B the ports 116 are shown as vertically extending upwardly open rectangular slots closed by the base of a cap (not shown in FIGS. 3A and 3B), such as cap 54 (FIG. 2), and ports 126, shown as vertically extending upwardly open rectangular slots closed by the base of main burner 56, it is appreciated that the port openings for burners 56 and 58 could be formed as continuous annular slots or gaps or be a series of holes formed by the respective sidewalls of burners 56 and 58 or some combination of the rectangular slots, the annular slots, the gaps, and the series of holes, depending on the desired flame shape. In an alternative embodiment, a number of ports 126 located at the circumference of simmer burner 58 is lower than a number of ports 116 located at the circumference of main burner 56.

Figure 4:
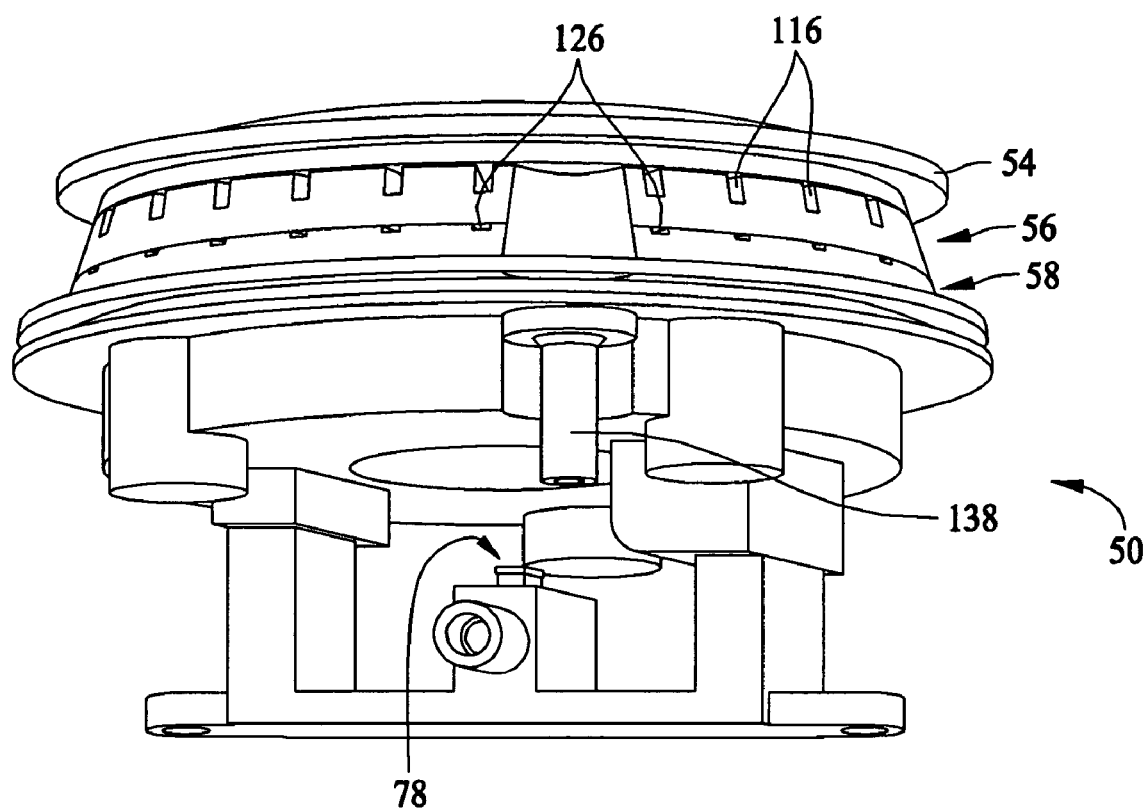
FIG. 4 is an isometric 3-dimensional (3D) view of a burner assembly of FIG. 2.
Figure 5:
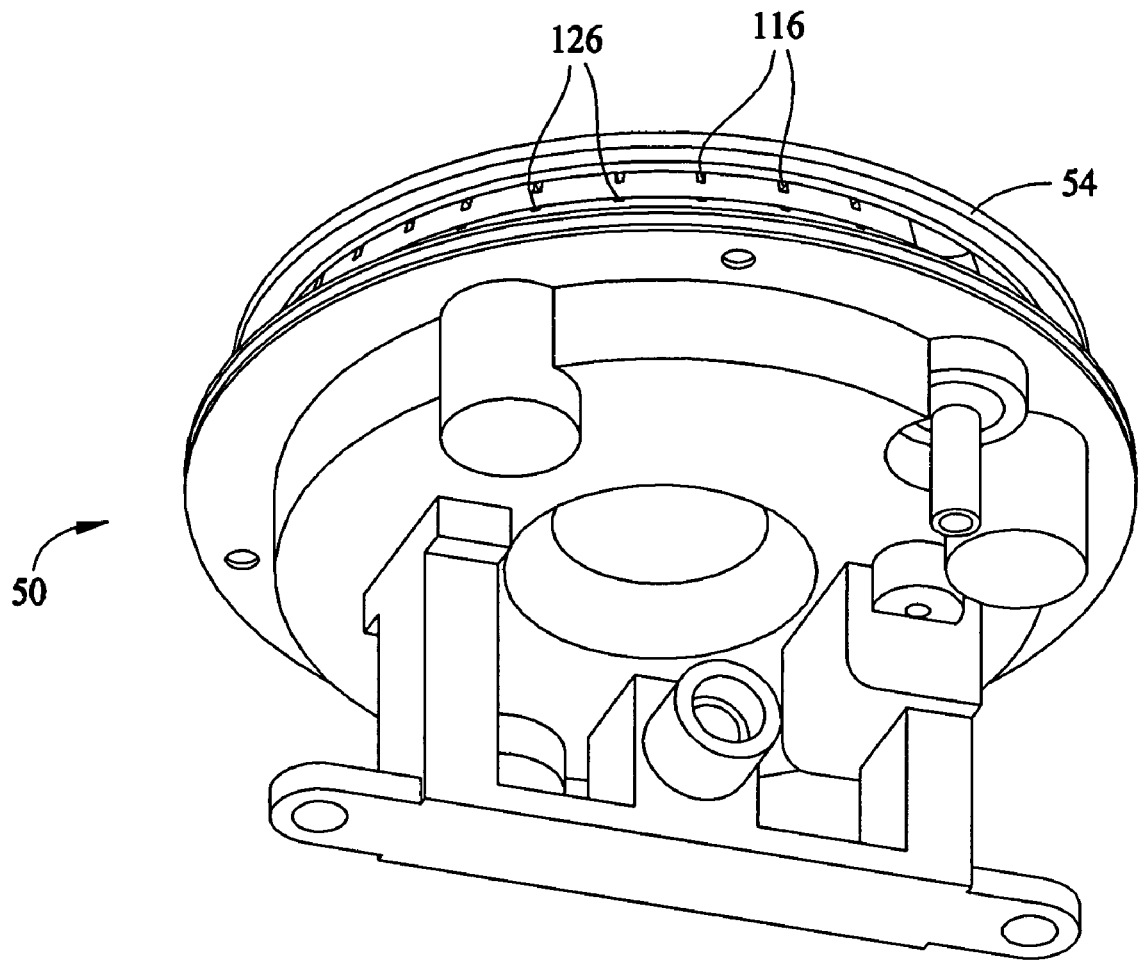
FIG. 5 is another isometric 3D view of the burner assembly of FIG. 4.

FIGS. 4 and 5 show isometric 3-dimensional (3D) views of burner assembly 50. Burner assembly 50 includes a cap 54, a main burner 56, a simmer burner 58, an ignition source 138, and an orifice 78. Main burner 56 includes ports 116 along its circumference and simmer burner 58 includes ports 126 along its circumference. Simmer burner 58 is located below main burner 56 and has a larger circumference along which ports 126 lie than the circumference along which ports 116 lie. Main burner 56 includes ports 116 around its circumference and simmer burner 58 includes ports 126 located around its circumference. Gas supplied via orifices 78 and 86 (shown in FIG. 2, but not in FIGS. 4 and 5) mixes with primary-air to form an air-gas mixture. The air-gas mixture flows through venturis 88 and 95 (See FIG. 2) and is ignited by ignition source 138 to create flames at ports 116 and 126. The resulting thermal energy is delivered to the cooking pot located on top of main burner 56 faster than if main burner 56 is located below simmer burner 58. The cooking pot heats faster because the main burner 56 is located closer to simmer burner 58 and the smaller diameter of the main burner 56 focuses the heat output via ports 116. Moreover, heat is also output from ports 126 of simmer burner 58 to slowly heat the cooking pot without overheating main burner 56 and the cooking pot. The larger diameter of simmer burner 58 reduces any chances of overheating main burner 56.

Figure 6:
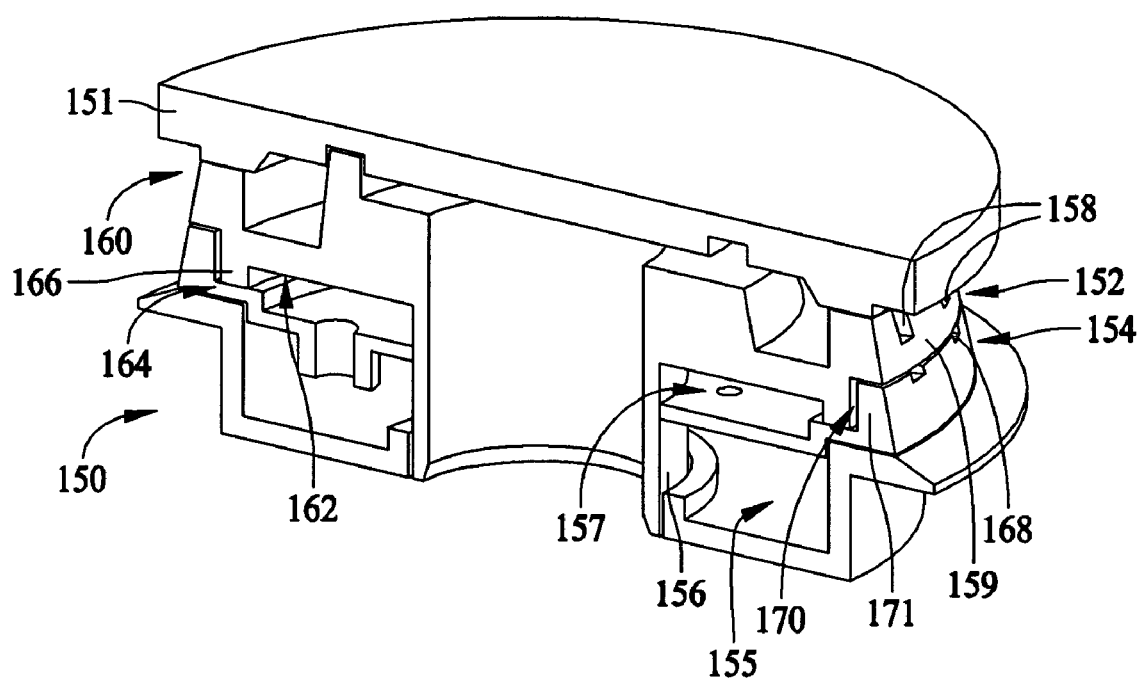
FIG. 6 is a cross-sectional 3D view of another alternative embodiment of a burner assembly.
Figure 7:
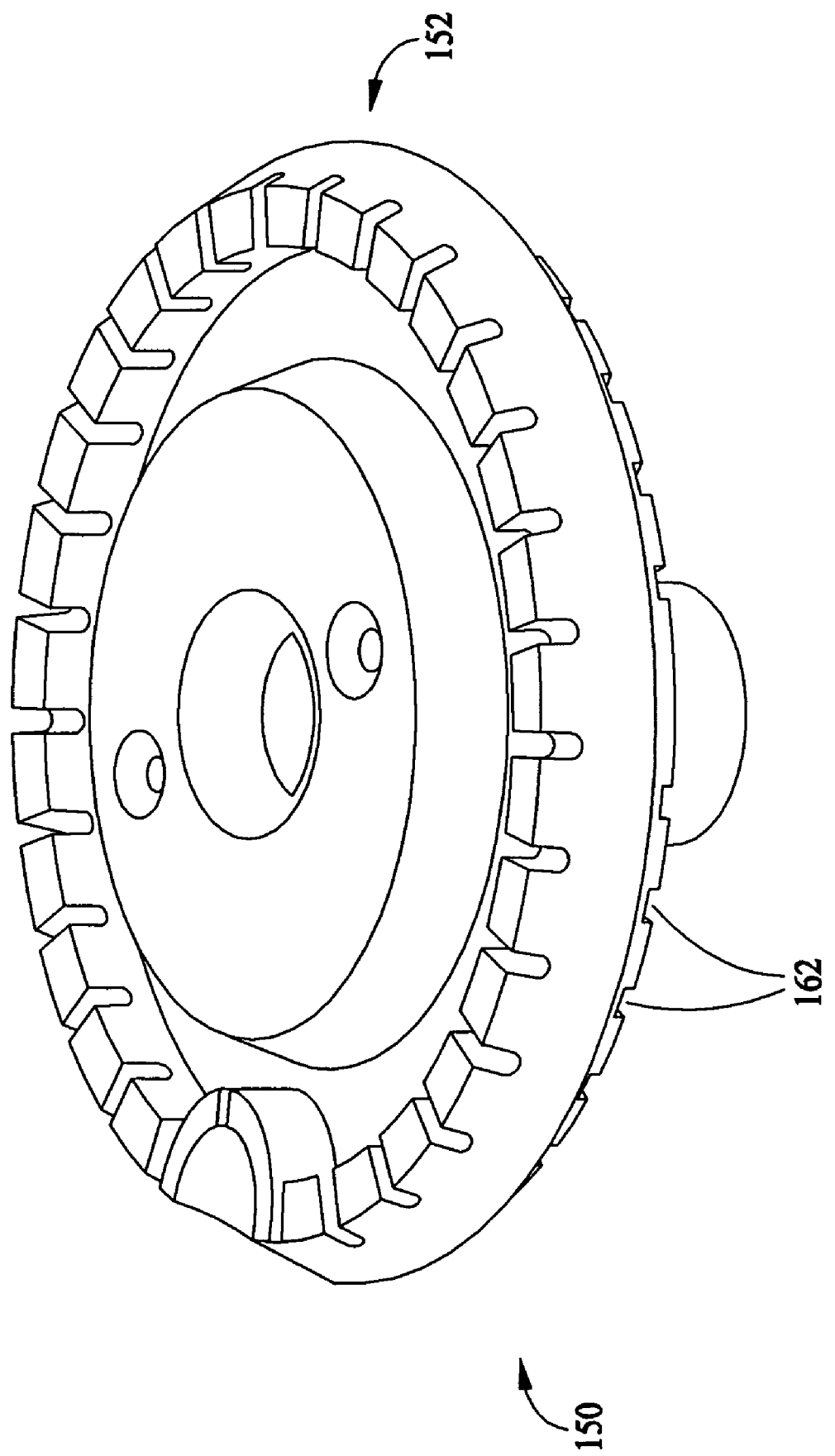
FIG. 7 is an isometric 3D view of the top burner of FIG. 6.

FIG. 6 shows a cross-sectional 3D view of another alternative embodiment of a burner assembly 150 and FIG. 7 shows a 3D view of burner assembly 150. Burner assembly 150 includes a cap 151, a main burner 152, a simmer burner 154, a primary air chamber 155, a simmer chamber 157, and a venturi 156. Main burner 152 includes external ports 158 formed in outer wall 159 of burner 152 along its top circumference 160. A set of interior ports 162 are located at a bottom circumference 164 of main burner 152. Ports 162 are created within a downwardly extending interior wall 166 of main burner 152. Wall 166 extends downwardly into simmer chamber 157 to form an annular channel 170 around the periphery of simmer chamber 157 between wall 166 and a simmer burner wall 171. Ports 168 of simmer burner 154 are formed in wall 171. As described with reference to the burner of FIG. 2, simmer chamber 157 receives primary-air from primary-air chamber 155. Annular channel 170 provides a form of manifold for the air-gas mixture that flows from the simmer chamber 157 to ports 168 through ports 162 facilitating an even distribution of the air-gas mixture to ports 168.

Annular channel 170 is advantageous, but not essential. In a lower cost alternative embodiment, wall 166 is not included. In such a structure without wall 166, ports 168 communicate directly with the main interior of the simmer chamber 157 with no intervening annular channel 170.

Figure 8:
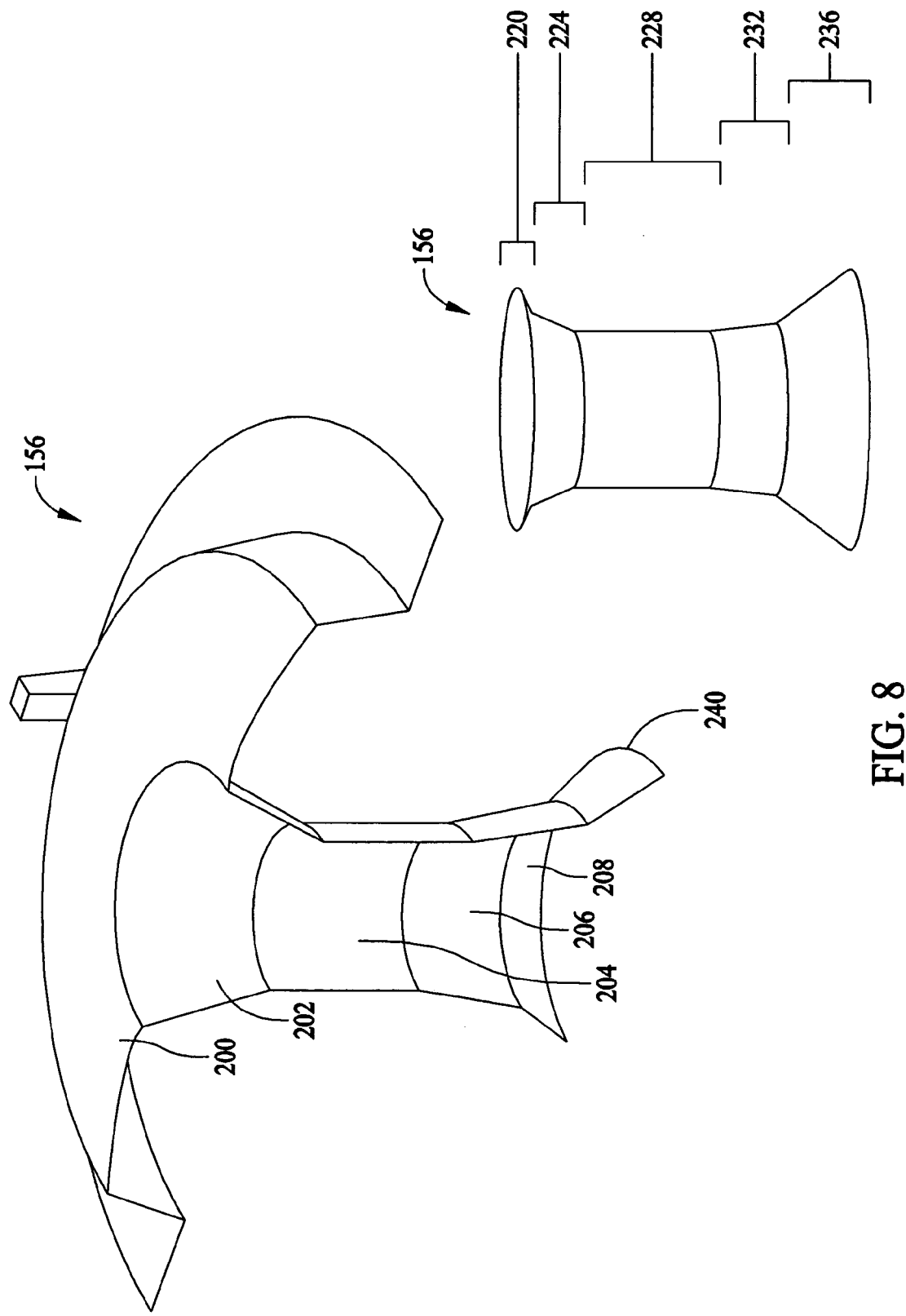
FIG. 8 is a 3D image of an embodiment of a venturi and a 3D image of a cross-sectional view of the venturi.

FIG. 8 shows a 3D image of an embodiment of venturi 156 and a 3D image of a cross-sectional view of venturi 156. Dimensions of internal walls 200, 202, 204, 206, and 208 of venturi 156 conform to a shape of flow, such as, shown in FIGS. 10 and 11, of a substance, such as a liquid or an air-gas mixture, flowing within venturi 156. Venturi 156 includes five portions 220, 224, 228, 232, and 236 having a variety of inner profiles.

Portions 220 and 236 as well as the walls 200, 202, 204, 206 and 208 are contoured to follow the flow of air-gas mixture within venturi 156. This is to prevent flow losses and to avoid formation of recirculation zones inside the venturi 156. The flow of the air-gas mixture depends on several factors including a distance between orifice 78 from which a gas within the air-gas mixture is supplied and an entrance 240 of venturi 156, geometric constraints of main burner 54, burner rating, or a size of orifice 78, where the burner rating is an amount of energy output from main burner 56. For example, a burner rating of 17000 BTU/hr, a size of orifice 78 formed approximately equal to 0.0787 inches ("), a distance between the orifice 78 and entrance 240 approximately equal to 0.43", approximate diameters of portions 220, 224, 228, 232, and 236 as shown in FIG. 9, approximate heights of portions 220, 224, 228, 232, and 236 as shown in FIG. 9, and approximate angles formed between portions 220, 224, 228, 232, and 236 and a line that passes through a center of venturi 156, referred to as center line, as shown in FIG. 9 affect the flow of air-gas mixture within venturi 156.

Moreover, the gas within the air-gas mixture at at least one flow condition of importance, such as at high flow condition, contacts one of walls 200, 202, 204, 206, and 208 of venturi 156 within one-half to two-thirds of the height of venturi 156. For example, if the height of venturi 156 is 1", the air-gas mixture contacts one of walls 200, 202, 204, 206, and 208 of venturi 156 within 0.5" to 0.66" along the centerline after entering venturi 156. In an alternative embodiment, venturi 156 includes more or less than five portions.

Figure 9:
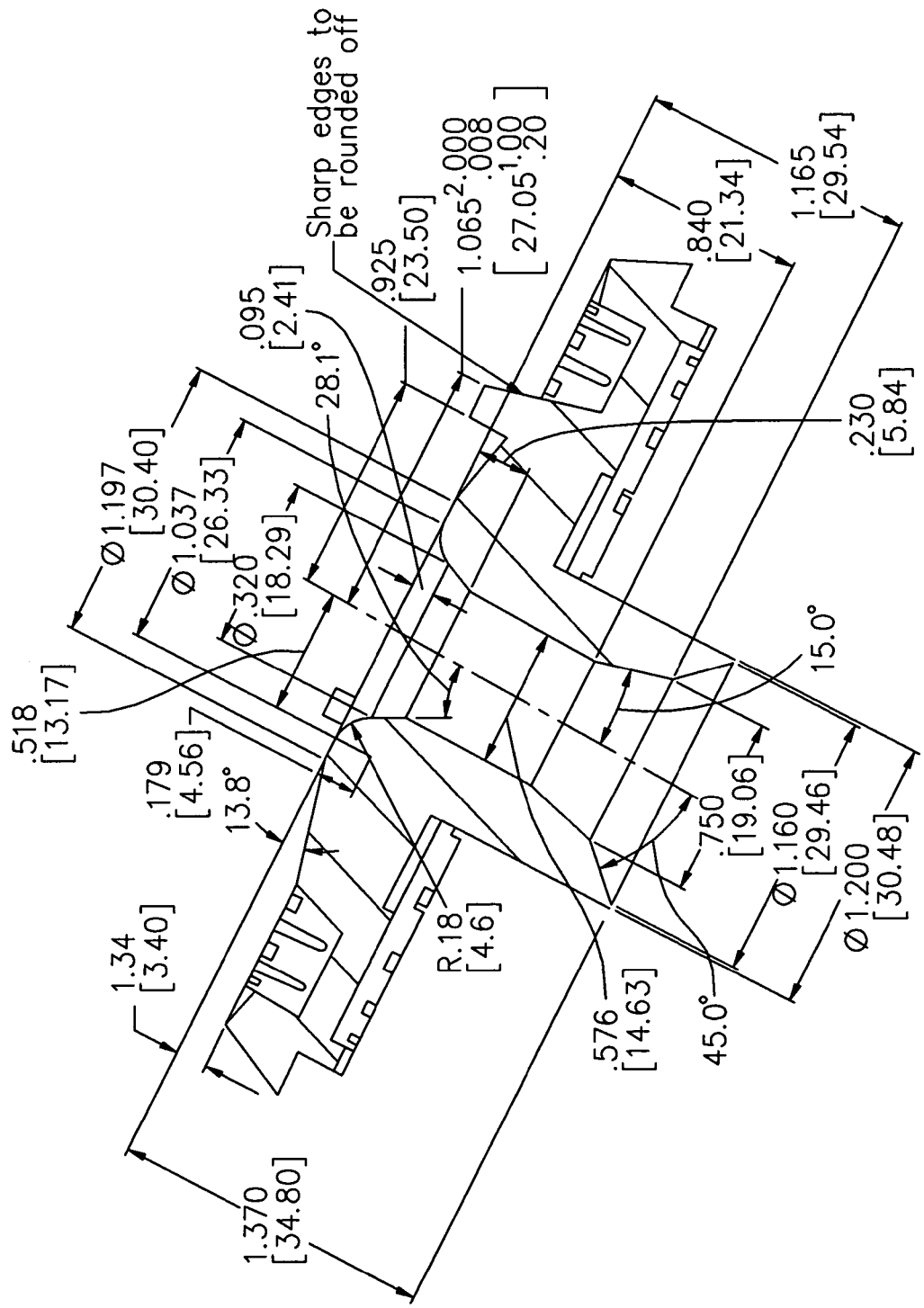
FIG. 9 is a two-dimensional (2D) detailed diagram of an embodiment of a venturi.

FIG. 9 provides approximate dimensions of a venturi used in a 17000 BTU/hr burner. In an alternative embodiment, for a burner rating of 20000 BTU/hr, the diameters and heights illustrated in FIG. 9 increase by approximately 0.25" and for a burner rating of 12000 BTU/hr, the diameters and heights mentioned above decrease by approximately 0.25".

Figure 10:
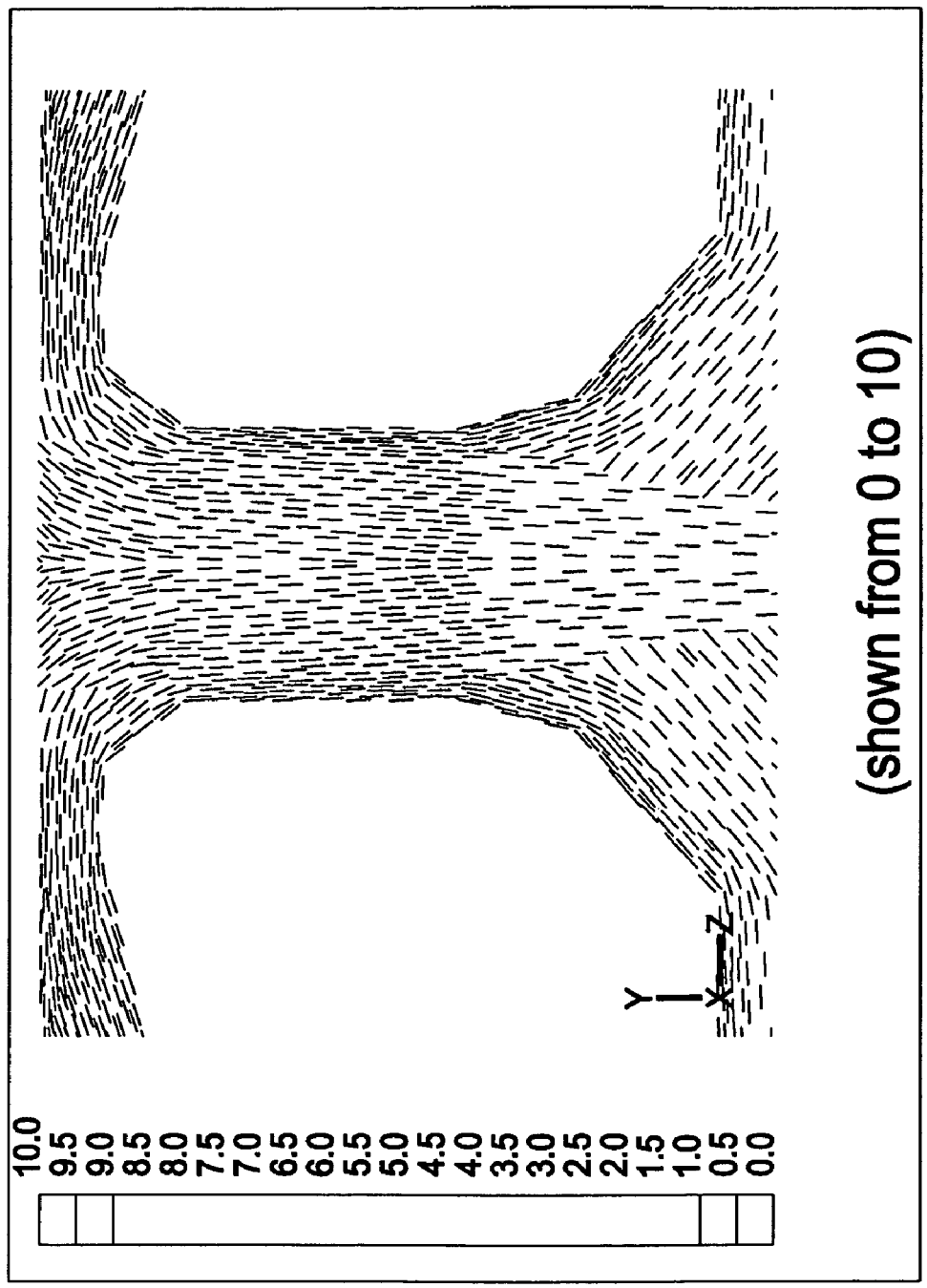
FIG. 10 is an image displaying motion vectors that represent a flow of air-gas mixture within the venturi of FIG. 8.

FIG. 10 is an image showing motion vectors that represent a flow of air-gas mixture within venturi 156. Speed of the flow ranges from 0 meters/second (m/s) to 10 ml/s. There are no recirculation zones in which the air-gas mixture is recirculated within venturi 156 because dimensions of venturi 156 are conformed to a shape of the flow of the air-gas mixture within venturi 156. Absence of recirculation zones increases primary-air entrainment and the effectiveness of the venturi. For example, in a typical design shown in FIG. 9, the primary-air entrainment was increased by 69.8% as compared to a baseline conventional venturi-burner arrangement.

Figure 11:
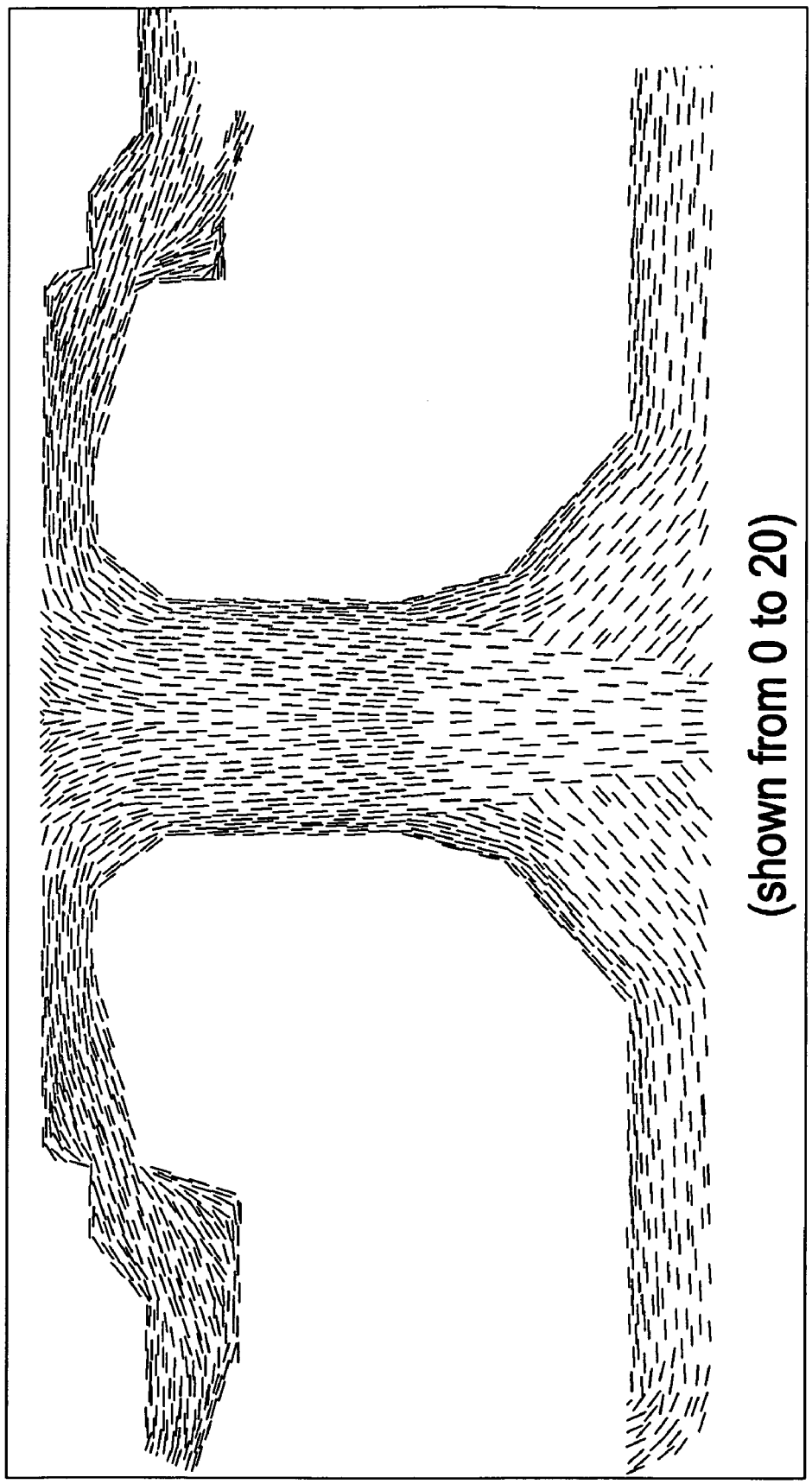
FIG. 11 is an image showing motion vectors that represent a flow of air-gas mixture within the venturi of FIG. 8.

FIG. 11 is an image showing motion vectors that represent a flow of air-gas mixture within venturi 156. Speed of the flow ranges from 0 m/s to 20 m/s.

Figure 12:
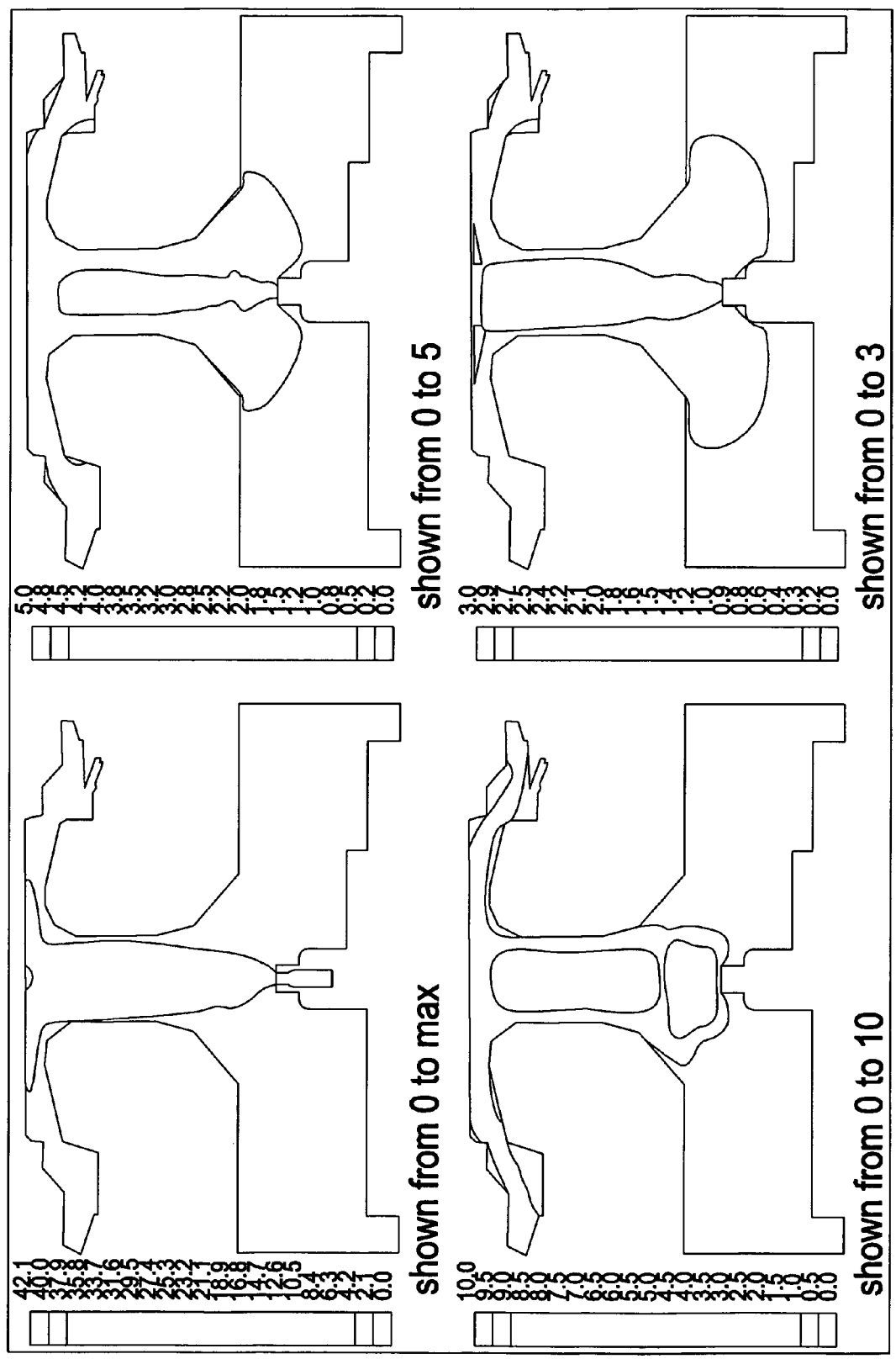
FIG. 12 shows images of flows of air-gas mixture flowing via a venturi at various speeds.

FIG. 12 shows images of flows of air-gas mixture at various speeds, such as, ranging between 0-42.1 m/s, 0-5 m/s, 0-10 m/s, and 0-3 m/s. The air-gas-mixture flows via venturi 156, which is manufactured to conform to shapes of the flows of the air-gas mixture.

Figure 13:
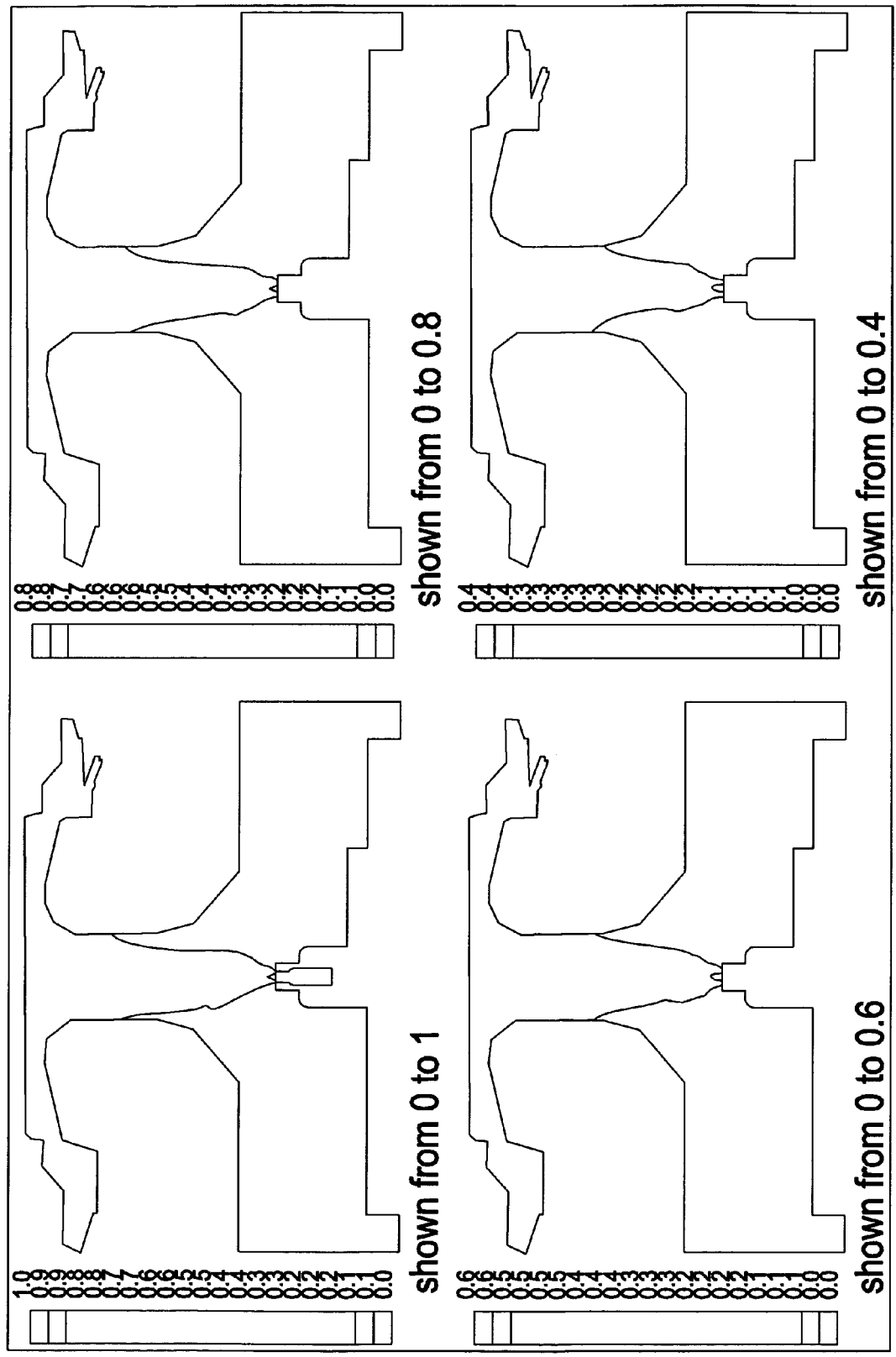
FIG. 13 shows images of flows of air-gas mixture with various mass fractions and flowing via a venturi.

FIG. 13 shows images of flows of air-gas mixture with various mass fractions, such as, ranging from 0-1, 0-0.8, 0-0.6, and 0-0.4, of methane ($CH_4$). The air-gas-mixture flows via venturi 156, whose dimensions are conformed to the shapes of flows of the air-gas mixture.

Technical effects of burner assembly 50 include a high energy output, a fast time to boil, a fast time to heat, a high thermal efficiency, and cost-effectiveness. It is noted that the fast time to boil or heat varies with a variety of factors, such as, type of liquid, environmental conditions, amount of the liquid, types of grates supporting a utensil in which the liquid is placed over burner assembly 50, and flame impingement on the grates. For example, a high thermal efficiency between 37% and 50% and a fast time to heat between 10 and 14 minutes are provided when six liters of water is heated from a temperature of approximately 75 degrees Fahrenheit to approximately 185 degrees Fahrenheit. The water is heated by using the burner assembly 50 with a high energy output of 18000 BTU/hr.

Moreover, since simmer burner 58 is farther from the cooking pot as compared to main burner 56, there is a higher amount of secondary air entrainment than if simmer burner 58 is placed closer to the cooking pot than main burner 56. The higher amount of secondary air entrainment facilitates heat to spread to bottom of the cooking vessel more uniformly than if simmer burner 58 is placed closer to the cooking vessel than main burner 56. Furthermore, main burner 56 can be designed for a high output performance because a frequency of use of main burner 56 is reduced. The frequency of use of main burner 56 is reduced because simmer burner 58 is generally used when energy output from burner assembly 50 is low.

It is noted that burner assembly 50 is not limited to being used in a particular type of cooking range or appliance. For example, burner assembly 50 can be used in various types of residential and/or commercial gas-fired applications, such as, gas ranges, cooktops, slide-ins/drop-ins, water-heaters, gas furnaces, or boilers.

It is also noted that the venturi invention as embodied in venturi 156 is not limited to being used in a particular type of cooking range or appliance. For instance, such a venturi can be used in the residential and/or commercial gas-fired applications and in liquid applications where a liquid flows through the venturi. In addition, such a venturi can be used in other residential and/or commercial applications such as, for example, in carburetors, jet engines, rocket engines, or inspirators. The dimensions shown in FIG. 9 vary with the applications.

While the invention has been described in terms of various specific embodiments, those skilled in the art will recognize that the invention can be practiced with modification within the spirit and scope of the claims.

What is claimed is:

1. A cooktop burner assembly comprising:
   a main burner; and
   a simmer burner positioned in a stacked relationship with and located below said main burner, wherein a diameter of said simmer burner is greater than a diameter of said main burner, said simmer burner comprising a first set of ports configured to output a flame and a second set of ports located behind said first set of ports configured to distribute an air-gas mixture to said first set of ports.

2. A cooktop burner assembly in accordance with claim 1 further comprising:
   a cooktop surface; and
   a chamber located below said simmer burner, wherein at least a portion of said chamber is located above said cooktop surface, and said portion is configured to draw primary air from above said cooktop surface for isolating said simmer burner from dynamic air pressure changes below said cooktop surface.

3. A cooktop burner assembly in accordance with claim 1 wherein said main and simmer burners are concentric with respect to each other.

4. A cooktop burner assembly in accordance with claim 1 wherein said main burner further comprises ports configured to output air and gas.

5. A cooktop burner assembly in accordance with claim 1 wherein said simmer burner defines a plurality of ports, at least one of said plurality of ports at least partially defined by a base of said main burner.

6. A cooktop burner assembly in accordance with claim 1 wherein said main burner further comprises a first wall extending into a chamber at least partially defined by a second wall of said simmer burner, an annular channel defined between said first wall and said simmer second wall.

7. A gas burner assembly for a cooking appliance with a cooktop for surface cooking comprising:
   a first burner extending above the cooktop surface;
   a second burner extending above the cooktop surface and positioned in a stacked relationship with and located below said first burner, said second burner comprising a first set of ports configured to output a flame and a second set of ports located behind said first set of ports configured to distribute an air-gas mixture to said first set of ports; and
   a chamber located below said second burner, wherein said chamber is configured as a primary air reservoir for one of said first and said second burners, at least a portion of said chamber extending above the cooktop surface, said portion being configured to draw primary air from above the cooktop surface for isolating said second burner from the effects of pressure changes occurring below the cooktop surface.

8. A gas burner assembly in accordance with claim 7 wherein an output provided by said first burner is higher than an output provided by said second burner.

9. A gas burner assembly in accordance with claim 7 wherein said first and second burners are concentric with respect to each other.

10. A gas burner assembly in accordance with claim 7 wherein said chamber comprises ports to receive primary air from above the cooktop surface.

11. A gas burner assembly in accordance with claim 7 wherein a number of ports included within said second burner is lower than a number of ports included within said first burner.

12. A gas burner assembly in accordance with claim 7 wherein the primary air is received by said second burner from said chamber.

13. A gas burner assembly in accordance with claim 7 wherein said first burner is configured to output a variable amount of energy and said second burner is configured to output a fixed amount of energy.

14. A gas burner assembly in accordance with claim 7 wherein each of said first burner and said second burner is configured to output a variable amount of energy.

15. A gas burner assembly in accordance with claim 7 wherein said first burner comprises a first set of ports and a second set of ports, each port within the second set is vertically below each port within the first set.

16. A gas burner assembly in accordance with claim 7 further comprising a venturi configured to supply an air-gas mixture including air and gas to at least one of said first and second burners, wherein dimensions of said venturi conform to a shape of a flow of the air-gas mixture within said venturi for preventing formation of recirculation zones within said venturi.

17. A gas burner comprising a venturi configured to supply a substance to said burner, wherein dimensions of said venturi conform to a shape of a flow of the substance within said venturi to facilitate preventing formation of a recirculation zone within said venturi, said venturi comprising a first wall portion defining a first inner profile and a second wall portion defining a second inner profile different from the first inner profile and substantially parallel to a vertical center axis of said venturi.

18. A gas burner in accordance with claim 17 wherein internal walls of said venturi are configured to contact the substance at a height that ranges between one-half to two-thirds of a total height of said venturi.

19. A gas burner assembly for a cooking appliance with a cooktop for surface cooking comprising:
   a first burner extending above the cooktop surface;
   a second burner extending above the cooktop surface and positioned in a stacked relationship with and located below said first burner; and
   a chamber located below said second burner, said chamber configured as a primary air reservoir for one of said first and said second burners, at least a portion of said chamber extending above the cooktop surface, said portion being configured to draw primary air from above the cooktop surface for isolating said second burner from the effects of pressure changes occurring below the cooktop surface, said first burner comprising a first set of ports and a second set of ports, each port within the second set is vertically lower than each port within the first set, said second burner comprising a third set of ports, and an annular channel is formed between the second and third set of ports.

* * * * *